United States Patent [19]
Folger et al.

[11] Patent Number: 4,567,459
[45] Date of Patent: Jan. 28, 1986

[54] TRANSMISSION METHOD FOR VARIABLE MEASURED VALUES FROM VEHICLE WHEELS UTILIZING AMBIENT TEMPERATURE COMPENSTION

[75] Inventors: Josef Folger, Munich; Hans-Dieter Fournell, Haar; Hans-Rudolf Hein, Munich; Karl Kapfhammer, Germering; Josef Rambock; Michael Weber, both of Munich, all of Fed. Rep. of Germany

[73] Assignee: Bayerische Motoren Werke Aktiengesellschaft, Fed. Rep. of Germany

[21] Appl. No.: 367,234

[22] PCT Filed: Aug. 5, 1981

[86] PCT No.: PCT/EP81/00113
 § 371 Date: Apr. 5, 1982
 § 102(e) Date: Apr. 5, 1982

[30] Foreign Application Priority Data
Aug. 5, 1980 [DE] Fed. Rep. of Germany ....... 3029563

[51] Int. Cl.[4] ............................................. B60C 23/00
[52] U.S. Cl. ..................................... 340/58; 73/146.5; 200/61.22
[58] Field of Search ............... 73/146.5, 708, 146.8; 340/58, 870.31, 870.32, 870.42, 870.16, 870.18; 374/154, 169, 170, 171, 172; 200/61.22, 61.25

[56] References Cited
U.S. PATENT DOCUMENTS

| | | |
|---|---|---|
| 3,387,206 | 6/1968 | Sampson .............................. 374/169 |
| 3,662,335 | 5/1972 | Fritze .................................... 340/58 |
| 3,694,803 | 9/1972 | Strenglein . | |
| 3,840,850 | 10/1974 | Whiteing ............................. 340/58 |
| 3,852,717 | 12/1974 | Hosaka ................................ 340/58 |
| 3,878,721 | 4/1975 | Nath .................................... 374/154 |
| 3,898,615 | 8/1975 | Hosaka ................................ 340/58 |
| 3,911,434 | 10/1975 | Cook . | |
| 4,143,545 | 3/1979 | Sitabkhan ........................... 73/708 |
| 4,246,567 | 1/1981 | Miller .................................. 340/58 |
| 4,254,312 | 3/1981 | Migrin ............................ 200/61.25 |
| 4,312,001 | 1/1982 | Marzolf ......................... 340/870.32 |
| 4,334,215 | 6/1982 | Frazier ................................ 340/58 |
| 4,334,428 | 6/1982 | Fima ................................. 73/146.5 |
| 4,335,283 | 6/1982 | Migrin ............................... 73/146.8 |
| 4,354,190 | 10/1982 | Reschovsky .................. 340/870.42 |

FOREIGN PATENT DOCUMENTS

| | | |
|---|---|---|
| 1946627 | 4/1971 | Fed. Rep. of Germany . |
| 2902213 | 7/1980 | Fed. Rep. of Germany . |
| 2915272 | 10/1980 | Fed. Rep. of Germany . |
| 2218562 | 9/1974 | France . |
| 2404375 | 4/1979 | France . |
| 968041 | 8/1964 | United Kingdom . |
| 2037125 | 7/1980 | United Kingdom . |

OTHER PUBLICATIONS

Aviation Week and Space Technology, May 1979, Mayfield, "Cockpit Display of Aircraft Tire Pressure."

*Primary Examiner*—John W. Caldwell, Sr.
*Assistant Examiner*—Michael F. Heim
*Attorney, Agent, or Firm*—Craig & Burns

[57] ABSTRACT

In a transmission method for variable parameters from loaded vehicle wheels, wherein energy is transmitted to a secondary coil (5) mounted concentrically on a wheel during varying excitation by a primary coil (2) integral with a vehicle, and an information signal, which is a function of the output signal of a sensor, is fed back from this secondary coil to a receiving coil integral with the vehicle, the primary coil (2) itself serves as the receiving coil. The information signal can be temperature-compensated, and compared in an evaluation circuit with a set value which is modified in accordance with various pressure-related parameters.

10 Claims, 5 Drawing Figures

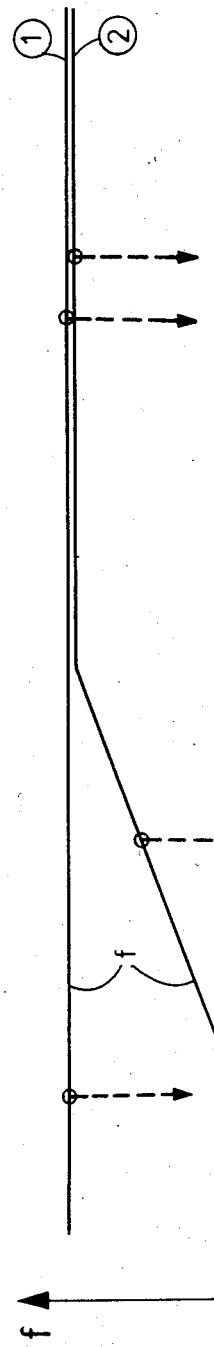

TRANSMISSION METHOD FOR VARIABLE MEASURED VALUES FROM VEHICLE WHEELS UTILIZING AMBIENT TEMPERATURE COMPENSATION

The invention relates to a transmission method for variable measured values from vehicle wheels, wherein energy is transmitted to a secondary coil mounted concentrically on the wheel during variable excitation produced by a primary coil integral with the vehicle, and an information signal, which is a function of the output signal from a sensor, is fed back to a receiving coil integral with the vehicle from this secondary coil.

In a known method of this type, the energy signal is fed back to a receiving coil which is independent of the primary coil (German Pat. No. 1,946,627). This results in a considerable construction cost, since, on the one hand, two coils must be provided which are integral with the vehicle and, on the other hand, the fact that these coils must be mounted next to the wheel as a rule poses considerable problems because of the limited space available for mounting them.

The goal of the invention is to reduce the construction costs in a method of the type described hereinabove.

This goal is achieved by the information signal being fed back to the primary coil as a receiving coil.

The method according to the invention can be used with low-frequency excitation of the primary coil. The primary and secondary coils then operate as a so-called "transformer sensor". The frequency can even be raised, so that the two coils operate as a transmitter and receiver. In both cases, the advantage of the invention is that only a single coil need be mounted integrally with the vehicle.

The information signal has a higher frequency for improved differentiation of the actual excitation of the primary coil from the excitation which is produced by the fed-back information signal. An evaluation circuit can be permanently connected to the primary coil through a high-pass filter, which lets only the information signal through. The high-pass filter in this case can be connected to the power supply of the primary coil.

Alternatively, or additionally, the primary coil can be excited in a pulse fashion, and the information signal can be fed back during the spaces between the pulses. In both cases, evaluation of the information signal requires no special expenditure for measurement, since the primary coil can be excited and the information signal fed back at different times.

The cost of construction and circuitry can be further reduced by powering the sensor through a threshold value switch from a capacitor connected to the secondary coil. These elements, mounted on or in the wheel, can be combined to form a compact module.

The losses involved in transmitting energy, to the coil and feeding back the information signal to the primary coil can be kept particularly low if the primary and secondary coils have the same number of windings.

The method according to the invention can be used for example to transmit the temperature or imbalance of the wheel as a measured value. If the tire pressure is transmitted as a measured value, an abnormal (i.e., as a rule, too low) tire pressure can be determined as a function of tire temperature. In addition, as is known from German Pat. No. 1,946,627, a measured value which is a function of tire temperature can also be transmitted.

The two measured values, the tire pressure and the tire temperature, can then be analyzed to determine whether the tire pressure, which is a function of tire temperature, has fallen below a set value and, if so, a warning signal can be triggered.

On the other hand, one advantageous embodiment of the invention consists in the information signal associated with the tire pressure being temperature-compensated. Since temperature has a great influence on tire pressure, a rise in pressure, which results from the temperature increase caused by the flexing of the tire, is compensated so that the set pressure which determines when the warning signal is triggered, need not be fed back as a function of this pressure rise.

If the output signal from the sensor is itself temperature-compensated, temperature-dependent components connected in series with the sensor, which would otherwise be necessary, may be omitted.

An information signal which is always temperature-compensated shows the same value at all temperatures and, as a rule, does not correspond to the actual tire pressure. As long as the temperature in the tire is lower than it was when the tire was filled, the tire pressure may fall below the required value. A decrease of this kind during operation can be detected by taking ambient temperature into account. The temperature is measured by means of a temperature sensor mounted in the vehicle and fed to the evaluating circuit. The basic idea here is that an "inner" temperature rise in the tire resulting from flexing must be differentiated from the "outer" temperature change produced by the ambient temperature.

An approximation of this method provides that the information signal is temperature-compensated only above a predetermined temperature limit. In this case the ambient temperature need not be determined. As long as the ambient temperature is the same as the temperature limit, an increase in tire temperature and the associated increase in tire pressure will not be incorporated into the information signal. On the other hand, a pressure drop resulting from a decrease in ambient temperature below the temperature limit will be detected. By appropriately selecting a temperature limit of approximately 300 K., it is possible to detect a drop below a critical pressure value resulting from a low tire temperature as well as a pressure drop resulting from a leak, of course, while a pressure rise above the limit as a result of a temperature rise produced by internal factors would have no effect.

There is another embodiment of the two methods mentioned above which consists in the set value changing to match the load status of the vehicle and/or atmospheric air pressure. These two parameters can be determined by sensors disposed in the vehicle and fed to the evaluating circuit. The set value can then be adjusted to suit ambient conditions.

The invention will now be described in further detail with reference to the drawings.

FIGS. 3 and 5 are diagrams to explain the function of a pressure sensor used for the method.

Figure 1:
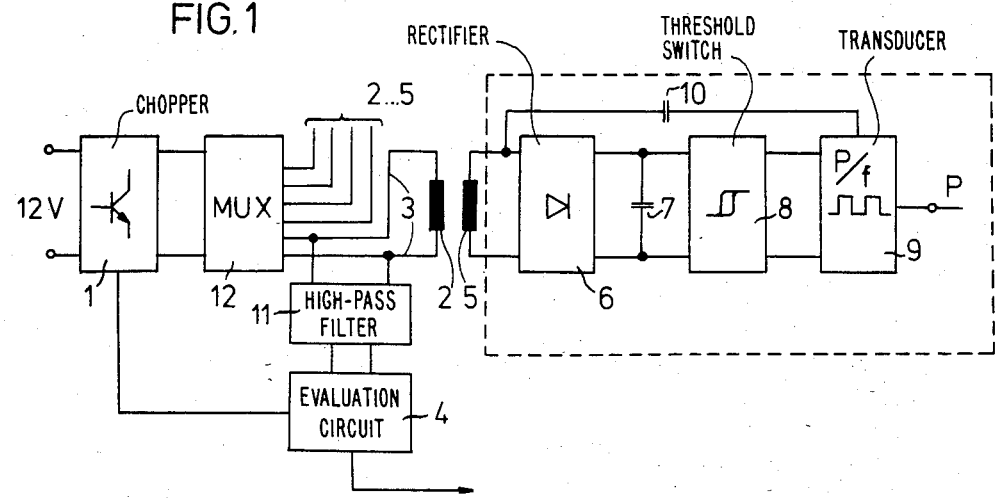
FIG. 1 is a schematic representation of a circuit for performing a method for determining the pressure of vehicle wheels.

For a method of determining tire pressure on vehicles, a chopper 1 connected to a DC voltage source and a primary coil 2 are mounted integrally with the vehicle. The coil is mounted for example on the brake guard panel of a wheel that has an axis parallel to the axis of the wheel. An evaluation circuit 4 is connected to the two leads 3 of the primary coil, said circuits being connected to a display, not shown.

A secondary coil 5 is mounted concentrically to the wheel axis on the vehicle wheel, said coil being connected in series with a rectifier stage 6, capacitor 7, a threshold value switch 8, and a pressure/frequency transducer 9. Transducer 9 is subjected to tire pressure. Primary coil 2 and secondary coil 5 have the same number of windings.

Chopper 1 connects primary coil 2 pulsewise to the vehicle battery which serves as a DC voltage source. As in a transformer (at low frequencies) or a transceiver, coil 5 is excited, supplying energy to the secondary. The output voltage from secondary coil 5, raised by rectifier stage 6 to a value which is required for transducer 9, charges capacitor 7. When capacitor 7 reaches a preset charge, the threshold value switch connects the capacitor with pressure/frequency transducer 9.

The output signal from pressure/frequency transducer 9 has a frequency which is a function of tire pressure, for example 5-10 kHz, and is a multiple of the frequency of chopper 1. It is fed to secondary coil 5 through a coupling capacitor 10 and received by primary coil 2 as an information signal. Because it has a higher frequency, it can be easily filtered out by a high-pass filter 11 for evaluation circuit 4.

The threshold value switch operates to couple capacitor 7 to transducer 9 when the voltage across capacitor 7 attains a threshold level. As long as threshold value switch 8 connects capacitor 7 with the pressure/frequency transducer 9, and the latter is powered, evaluation circuit 4 disconnects chopper 1. This means that during feedback of the information signal no energy is transmitted from primary coil 2 to secondary coil 5, thus separating the two transmission paths.

As long as a single pulsed excitation of the primary coil is sufficient to charge capacitor 7 above the threshold value, this disconnection of chopper 1 is not required since the information signal can be fed back in the pauses in excitation between two excitation pulses following one another at equal time intervals.

The tire pressures for all of the wheels of the vehicle can be determined in the same way. A multiplexer 12 is connected between the chopper and the primary coil; the multiplexer connects primary coils associated with the other wheels successively to the vehicle battery in the same way as described for one wheel. The same parts as shown are associated with the primary coils on the secondary side, i.e., in the wheels.

Figure 2:
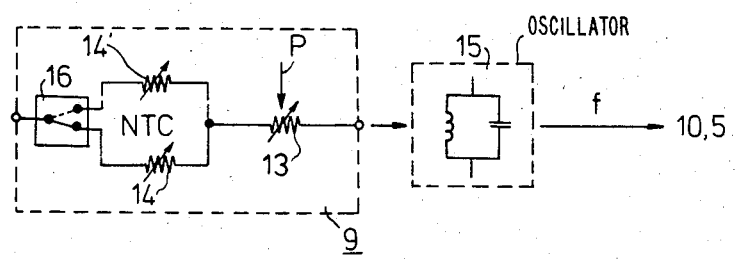
FIGS. 2 and 4 show portions of the circuit in FIG. 1 individually.

The construction of pressure/frequency transducer 9 in FIG. 1 is shown schematically in FIG. 2. The tire pressure acts upon a pressure-sensitive resistor 13, whose resistance changes as a function of tire pressure. An NTC resistor 14 is connected in series with resistor 13, and the resistance of resistor 14 changes as a function of the temperature of the tire. By appropriately selecting the characteristic curves of resistors 13 and 14, the sum of their resistances can be made independent of the temperature of the tire. This can be accomplished by having the change in resistance be inversely proportional to the change in resistance 13.

The series connection of resistors 13 and 14 acts as a variable parameter on an oscillator circuit 15, shown schematically, whose frequency changes as a function of this parameter. If this parameter is always temperature-compensated, frequency f of oscillator circuit 15 will be independent of the tire temperature and will depend only on tire pressure for different tires at the same tire temperature. The graph in FIG. 3 shows such a relationship, with frequency f being expressed as a function of tire temperature $\theta_R$ as a straight line 1. When the temperature remains constant and the tire pressure falls, frequency f will change. Depending on the characteristic curve of pressure/frequency transducer 9, the frequency will rise or, as indicated by the dashed arrows, sink.

An abnormal, i.e., successively low, tire pressure can then be determined, taking into account the ambient temperature, the load status of the vehicle, and atmospheric air pressure, with the aid of evaluation circuit 4.

Figure 4:
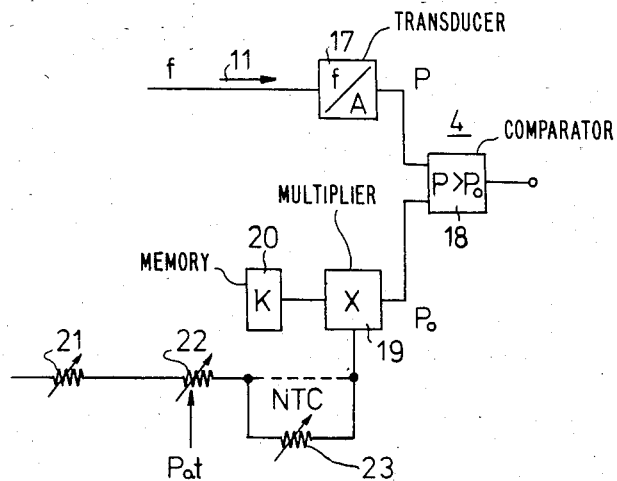

The evaluation circuit shown in FIG. 4 consists of a frequency/analog transducer 17, which receives the output signal from high-pass filter 11 and is connected to a comparator 18. Comparator 18 is in turn connected to a multiplier 19, which multiplies a pressure constant k stored in a memory 20 by a factor. This factor is generated as a function of ambient temperature, load status of the vehicle, and atmospheric air pressure. A factor which is a function of the ambient temperature is generated by a temperature-sensitive resistor 23 exposed to the ambient temperature. A resistor of this kind can be for example an NTC resistor, corresponding to resistor 14. The load status is determined with the aid of a transducer in the form of an adjustable resistor 21, mounted as a rule on the rear axle of the vehicle. An output signal proportional to the atmospheric air pressure is produced by a pressure-sensitive resistor 22 exposed to the ambient air pressure. A resistor of this kind is used for example in electronic ignition systems. Resistors 21, 22, and 23 are connected in series and generate the above factor as an analog input value for multiplier 19. Their characteristic curves are selected so that they produce a change in the tire pressure set value $p_0$, which is adjusted as precisely as possible to the ambient temperature, the load status, and the atmospheric air pressure. Set value $p_0$ is generated by multiplier 19 from its two input values, the pressure constant k, and the factor which is a function of ambient temperature, load status, and atmospheric air pressure. As long as tire pressure $p_r$ is smaller than set value $p_0$, comparator 18 will display a warning signal, not shown, for example, in the form of a warning light.

An approximation method eliminates measuring the ambient temperature. The frequency from the pressure/frequency transducer 9 which serves as a pressure sensor is temperature-compensated only above a predetermined temperature limit $\theta_N$. The temperature limit is in the range of actual operating temperatures of the tire and has a value of 300 K. for example. In this method, instead of NTC resistor 14 in FIG. 2, a temperature-dependent switch 16 cuts in a balancing resistor 14', whose constant, temperature-dependent value is equal to the value of the NTC resistor 14 at the temperature limit.

Below temperature limit $\theta_N$ resistors 14 and 14' affect oscillator circuit 15 while resistors 13 and 14 act as parameters above the temperature limit. The characteristic curve of a sensor of this kind is shown in FIG. 3 as curve 2. Assuming a constant volume of air in the tire, frequency f of transducer 9 will increase linearly for example for tire temperatures below the temperature limit $\theta_N$ as a function of tire temperature and will remain constant, independent of temperature, for tire temperatures above the temperature limit.

In this approximation method, evaluation circuit 4 shown in FIG. 4 of the ambient-temperature-dependent resistor 23 is short-circuited, as indicated by the dashed lines. Factor 19, entered in the multiplier, is then determined only by the series circuit composed of resistors 21 and 22, and is therefore dependent only upon the load status and the atmospheric air pressure.

The operation of sensor 9 in conjunction with evaluation circuit 4 is explained by the graph in FIG. 5.

In this graph, the curve showing the actual tire pressure $p_r$ is plotted as a dashed line. The output signal from transducer 9 (frequency f), shown in FIG. 3 for complete (tire) temperature compensation (curve 1) and partial compensation (curve 2) corresponds to a tire pressure p which in the first case is a temperature-independent constant value and in the second case is equal to the actual tire pressure for tire temperature values below the temperature limit $\theta_N$ and constant for values above the temperature limit. The curve of the pressure values plotted on the primary side in both cases is represented by curves 1' and 2'.

Parallel to curve 1' is a curve marked $p_0$, which is determined by the set value specified in the evaluation circuit 4. The distance $\Delta p$ of these curves $p_0$ from curve 1' is selected in accordance with safety requirements. A basic value for the set pressure is given by the pressure constant k, stored in memory 20 (FIG. 4). By contrast with this basic value, resistors 21, 22 and resistor 23 (since the ambient temperature is taken into account in the fully temperature-compensated curve 1') produce a parallel displacement of curve $p_0$. An increase (decrease) in the load status and atmospheric air pressure produces a parallel displacement upward (bottom); an increase (decrease) of the ambient temperature, on the other hand, results in a parallel displacement downward (top).

As a result of this position of curve $p_0$, in the case of the transmitted tire pressure information signal according to curve 1', a warning signal will always be triggered by the same pressure loss $\Delta p$ independently of the actual tire temperature. This pressure loss is equal to the spacing of curves 1' and $p_0$. The fact that these two curves are parallel means that the pressure loss which is critical for triggering a warning signal can be kept relatively small. A realistic value here is 0.1 bar, for example. This means that at high tire temperatures it is possible to trigger the warning signal when a pressure loss occurs which is so small it cannot be detected by the eye in view of the increased tire pressure at these temperatures. Since high tire temperatures occur when travelling on expressways at high speed, this should result in a considerable increase in traffic safety. Even when the tire temperature rises and the tire pressure increases along with it, the warning signal will be triggered prematurely if air loss and resultant pressure loss of 0.1 bar occurs. On the other hand, taking the ambient temperature into account means that the warning signal will also be triggered if the pressure drops below a minimum pressure required for operating safety of the tire. In evaluation circuit 4, when the ambient temperature drops to a value of 280 K., for example, curve $p_0$ for the set value will rise above curve 1' and trigger the warning signal.

In the case of the "kinked" curve of transducer 9, corresponding to curve 2', the warning signal will be triggered if the transmitter pressure signal is set below set value $p_0$. This is independent of tire temperature and changes only as a function of the load (resistor 21) and atmospheric air pressure (resistor 22). If the tire temperature is below the temperature limit, the warning signal will sound when a pressure loss occurs which is equal to the difference between the actual tire pressure and set value $p_0$. If the tire temperature is higher than the temperature limit, however, the warning signal will be triggered when there is a pressure loss which is equal to the difference between the tire pressure at the temperature limit and the set value $p_0$, regardless of the actual tire temperature. This difference is smaller than the difference between the actual tire pressure and the set value $p_0$. This decrease $\delta$ in the difference is shown graphically for an assumed tire temperature which is greater than the temperature limit $\theta_N$.

As can be seen this value $\delta$ increases as the tire temperature goes further above the temperature limit. Since high tire temperatures occur precisely when the tire is subjected to high stresses, the driver is made aware of a pressure loss much earlier than would be the case for a warning signal that responded at a fixed, preset tire pressure, regardless of the actual tire temperature. As in the exact method shown by curves 1 and 1', here again we can determine the pressure drops below a certain minimum. Below the temperature limit, the information signal which is transmitted corresponds exactly to the actual tire pressure. The warning signal is triggered when the tire pressure, represented by curve 2', drops below set value $p_0$.

For the sake of clarity, we have selected a set value $p_0$ which is the same for both curves 1' and 2'. The additional influence of ambient temperature, which is critical in the case of the exact method as shown by curves 1 and 1' and is determined by NTC resistor 23, is not shown in FIG. 5. Depending on the selected scale, it would result in the parallel displacement of curve $p_0$ relative to the one shown, which applies to the approximation method.

The use of the two methods for transmitting an at least partially (tire) temperature-compensated measurement signal is not limited to the arrangement using only one coil (2, 5) mounted on the vehicle and wheel. Thus, instead of using a load-status, atmospheric-air-pressure, and in the case of the exact method, ambient-temperature-dependent variable set value $p_0$, the measurement signal itself can be modified appropriately and compared with a fixed set value.

We claim:

1. In combination, a system for sending an information signal indicative of variable measured values from wheels of a vehicle, wherein energy is transmitted from a primary coil to a secondary coil mounted concentrically on at least one of said wheels during excitation of said primary coil mounted external of said wheels and fixedly connected with the vehicle, and said information signal, which is a function of the output signal of a sensor means located in said at least one of said wheels, is fed back from said secondary coil to the primary coil, the improvement comprising compensation means responsive to said primary coil for temperature-compensating said information signal, said compensation means including ambient temperature sensor means located external of said wheels for producing a set value indicative of ambient temperature about said vehicle; and an evaluation circuit for comparing the information signal with said set value whereby to correct representations of information signal due to changes in temperature.

2. The invention of claim 1, wherein the information signal has a higher frequency than the frequency of excitation of the primary coil (2).

3. The invention of claim 2, further including an evaluation circuit and a high-pass filter, and wherein the information signal is supplied to the evaluation circuit (4) through the high-pass filter (11).

4. The invention of claim 1, 2 or 3, wherein the excitation of the primary coil (2) is in the form of pulses and the information signal is fed back during pauses between the pulses.

5. The invention of claim 4, wherein the sensor means (9) is powered by a capacitor (7) connected in series with the secondary coil (5) through a threshold circuit (8).

6. The invention of claim 1, 2 or 3, wherein the primary and secondary coils (2, 5) have the same number of windings.

7. The invention of claim 1, wherein the output signal from the sensor means (9) is itself temperature-compensated.

8. The invention of claim 3, wherein the sensor means senses tire pressure to obtain pressure values as the variable measured values and the associated pressure values are compared in the evaluation circuit with a set value which changes as a function of ambient temperature.

9. The invention of claim 1, wherein the information signal is temperature-compensated only above a predetermined temperature limit.

10. The invention of claim 8, wherein the set value is varied in accordance with at least one of load status of the vehicle and atmospheric air pressure.

* * * * *